US008434566B2

(12) United States Patent
Forster et al.

(10) Patent No.: US 8,434,566 B2
(45) Date of Patent: May 7, 2013

(54) FASTENING TOOL

(75) Inventors: Michael Forster, White Hall, MD (US); Bhanuprasad V. Gorti, Abingdon, MD (US); Sam Woods, Bel Air, MD (US); Craig Schell, Baltimore, MD (US); Nathan Cruise, Parkville, MD (US)

(73) Assignee: Black & Decker Inc., Newark, DE (US)

( * ) Notice: Subject to any disclaimer, the term of this patent is extended or adjusted under 35 U.S.C. 154(b) by 412 days.

(21) Appl. No.: 12/417,928

(22) Filed: Apr. 3, 2009

(65) Prior Publication Data

US 2009/0183888 A1 Jul. 23, 2009

Related U.S. Application Data

(63) Continuation of application No. 11/095,722, filed on Mar. 31, 2005.

(51) Int. Cl.
*B23Q 5/081* (2006.01)

(52) U.S. Cl.
USPC .............................................. 173/176; 173/2

(58) Field of Classification Search .............. 173/2, 176; 362/119, 120; 408/16
See application file for complete search history.

(56) References Cited

U.S. PATENT DOCUMENTS

| | | | |
|---|---|---|---|
| 1,487,098 | A | 3/1924 | Goldsmith |
| 2,525,588 | A | 10/1950 | Cameron et al. |
| 2,795,663 | A | 6/1957 | Estes |
| 2,832,857 | A | 4/1958 | Landmeier |
| 3,252,641 | A | 5/1966 | Ciechanowski |
| 3,700,987 | A | 10/1972 | Deering |
| 4,129,240 | A | 12/1978 | Geist |
| 4,171,572 | A | 10/1979 | Nash |
| 4,204,622 | A | 5/1980 | Smith et al. |
| 4,292,574 | A | 9/1981 | Sipin et al. |
| 4,298,072 | A | 11/1981 | Baker et al. |
| 4,493,377 | A | 1/1985 | Günther et al. |
| 4,547,226 | A | 10/1985 | Milch et al. |
| 4,572,053 | A | 2/1986 | Sosnowski et al. |
| 4,612,463 | A | 9/1986 | Kikuchi |

(Continued)

FOREIGN PATENT DOCUMENTS

| | | |
|---|---|---|
| DE | G 82 32 406.9 | 4/1983 |
| DE | 32 40 857 A1 | 5/1984 |

(Continued)

OTHER PUBLICATIONS

Request for Ex-Parte Reexamination of 7,137,541 to Baskar et al., Aug. 3, 2010.

(Continued)

*Primary Examiner* — M. Alexandra Elve
*Assistant Examiner* — Nathaniel Chukwurah
(74) *Attorney, Agent, or Firm* — Rhonda L. Barton; Adan Ayala

(57) ABSTRACT

A power tool for operating on a workpiece, the power tool having a housing and a motor disposed within the housing. A controller is connected to the motor and receives user inputs for turning on the motor and a power tool battery pack is connected to the controller and the motor. At least one light is connected to the controller for illuminating the workpiece. The controller can turn on the light in a predetermined pattern to alert the user to a tool condition, such as the charge level being below a predetermined level.

7 Claims, 6 Drawing Sheets

U.S. PATENT DOCUMENTS

| | | | | |
|---|---|---|---|---|
| 4,622,500 | A | 11/1986 | Budelman, Jr. | |
| 4,679,719 | A | 7/1987 | Kramer | |
| 4,715,522 | A | 12/1987 | Jordan | |
| 4,724,992 | A | 2/1988 | Ohmori | |
| 4,763,347 | A | 8/1988 | Erdman | |
| 4,838,278 | A | 6/1989 | Wang et al. | |
| 4,928,868 | A | 5/1990 | Kerrigan | |
| 4,978,045 | A | 12/1990 | Murakami et al. | |
| 5,018,057 | A | 5/1991 | Biggs et al. | |
| 5,035,354 | A | 7/1991 | Meyer | |
| 5,038,481 | A | 8/1991 | Smith | |
| 5,169,225 | A | 12/1992 | Palm | |
| 5,189,349 | A | 2/1993 | Haga | |
| 5,219,578 | A | 6/1993 | Ansley | |
| 5,320,270 | A | 6/1994 | Crutcher | |
| 5,412,546 | A | 5/1995 | Huang | |
| 5,427,002 | A | 6/1995 | Edman | |
| 5,443,196 | A | 8/1995 | Burlington | |
| 5,473,519 | A * | 12/1995 | McCallops et al. | 362/120 |
| 5,495,161 | A | 2/1996 | Hunter | |
| 5,507,425 | A | 4/1996 | Ziglioli | |
| 5,511,715 | A | 4/1996 | Crutcher et al. | |
| 5,545,989 | A | 8/1996 | Tian et al. | |
| 5,551,621 | A | 9/1996 | Vallee | |
| 5,605,268 | A | 2/1997 | Hayashi et al. | |
| 5,723,832 | A | 3/1998 | Hall | |
| 5,732,870 | A | 3/1998 | Moorman et al. | |
| 5,772,096 | A | 6/1998 | Osuka et al. | |
| 5,794,831 | A | 8/1998 | Velan et al. | |
| 5,918,788 | A | 7/1999 | Moorman et al. | |
| 5,923,145 | A | 7/1999 | Reichard et al. | |
| 5,941,441 | A | 8/1999 | Ilagan | |
| 5,954,458 | A | 9/1999 | Lee | |
| 6,123,241 | A | 9/2000 | Walter et al. | |
| 6,168,287 | B1 | 1/2001 | Liu | |
| 6,206,538 | B1 | 3/2001 | Lemoine | |
| 6,213,372 | B1 | 4/2001 | Chen | |
| 6,296,065 | B1 | 10/2001 | Carrier | |
| 6,318,615 | B1 * | 11/2001 | Walter | 227/10 |
| 6,318,874 | B1 * | 11/2001 | Matsunaga | 362/119 |
| 6,371,348 | B1 | 4/2002 | Canlas et al. | |
| 6,382,492 | B1 | 5/2002 | Moorman et al. | |
| 6,423,241 | B1 | 7/2002 | Yoon et al. | |
| 6,431,425 | B1 | 8/2002 | Moorman et al. | |
| 6,465,750 | B1 | 10/2002 | Rubenstein | |
| 6,494,590 | B1 * | 12/2002 | Paganini et al. | 362/119 |
| 6,511,200 | B2 | 1/2003 | Matsunaga | |
| 6,536,536 | B1 | 3/2003 | Gass et al. | |
| 6,604,664 | B2 | 8/2003 | Robinson | |
| 6,705,503 | B1 | 3/2004 | Pedicini et al. | |
| 7,249,862 | B2 * | 7/2007 | Shirane | 362/119 |
| 2002/0185514 | A1 | 12/2002 | Adams et al. | |
| 2006/0193705 | A1 * | 8/2006 | Campbell | 408/16 |

FOREIGN PATENT DOCUMENTS

| | | | |
|---|---|---|---|
| DE | 31 25 494 | C2 | 12/1987 |
| DE | G 90 10 716.0 | | 10/1990 |
| DE | 44 05 661 | C2 | 1/1998 |
| DE | 197 56 360 | A1 | 1/1998 |
| DE | 297 19 020 | U1 | 1/1998 |
| DE | 298 07 070 | U1 | 7/1998 |
| DE | 44 05 648 | C2 | 8/1998 |
| DE | 198 03 936 | A1 | 8/1999 |
| EP | 0 298 594 | A2 | 1/1989 |
| EP | 0 313 187 | A1 | 4/1989 |
| EP | 0 546 834 | A | 6/1993 |
| EP | 0 680 808 | A1 | 4/1995 |
| EP | 0 662 750 | A | 7/1995 |
| EP | 0 829 329 | | 3/1998 |
| EP | 1 068 934 | A1 | 5/2000 |
| EP | 1 223 009 | A2 | 1/2002 |
| EP | 1 231 028 | A2 | 8/2002 |
| JP | 10-44064 | | 2/1989 |
| JP | 3-128625 | | 5/1991 |
| JP | 50-77969 | | 3/1993 |
| JP | 6-246645 | | 9/1994 |
| JP | 10006303 | A | 1/1998 |
| JP | 10-34564 | | 2/1998 |
| JP | 10034565 | | 2/1998 |
| JP | 10034566 | | 2/1998 |
| JP | 10044064 | | 2/1998 |
| JP | 11111002 | A | 4/1999 |
| WO | WO 93/03878 | | 3/1993 |
| WO | WO 96/12591 | | 5/1996 |
| WO | WO 99/02310 | | 1/1999 |
| WO | WO 02/16085 | | 2/2002 |
| WO | WO 02/051591 | | 7/2002 |
| WO | WO 02/051591 | A1 | 7/2002 |
| WO | WO 02/051592 | A1 | 7/2002 |

OTHER PUBLICATIONS

Request for Ex-Parte Reexamination of 7,285,877 to Gorti et al., Oct. 23, 2007.

* cited by examiner

FASTENING TOOL

CROSS-REFERENCE TO RELATED APPLICATIONS

This application claims priority to U.S. Provisional Patent Application Ser. No. 60/559,349 filed Apr. 2, 2004 entitled “Fastening Tool” and U.S. patent application Ser. No. 11/095,722 filed Mar. 31, 2005, entitled “Method For Operating A Power Driver”.

FIELD OF THE INVENTION

The present invention generally relates to driving tools, such as fastening tools, and more particularly to a method for operating a driving tool.

BACKGROUND OF THE INVENTION

Power nailers are relatively common place in the construction trades. Often times, however, the power nailers that are available may not provide the user with a desired degree of flexibility and freedom due to the presence of hoses and such that couple the power nailer to a source of pneumatic power. Accordingly, there remains a need in the art for an improved power nailer.

SUMMARY OF THE INVENTION

In one form, the teachings of the present invention provide a method that can include: providing a driving tool having a driver, a motor assembly and an electrical power source, the driver being movable along an axis, the motor assembly including a motor and an output member, that is driven by the motor and employed to transmit power to the driver to thereby cause the driver to translate along the axis; transmitting electrical power from the electrical power source to the motor over a first cycle portion to thereby rotate the output member; determining a parameter related to a rotational speed of the output member; and increasing a time interval of the first cycle portion if a magnitude of the parameter is less than a predetermined threshold.

In another form, form the teachings of the present invention provide a method that can include: providing a driving tool having a driver, a motor assembly and an electrical power source, the driver being movable along an axis, the motor assembly including a motor and an output member, that is driven by the motor and employed to transmit power to the driver to thereby cause the driver to translate along the axis; transmitting electrical power from the electrical power source to the motor over a first cycle portion to thereby rotate the output member; determining a parameter related to a rotational speed of the output member; and decreasing a time interval of the first cycle portion if a magnitude of the parameter is greater than a predetermined threshold.

In yet another form, the teachings of the present invention provide a method that can include: providing a driving tool having a driver, a motor assembly and an electrical power source, the driver being movable along an axis, the motor assembly including a motor and an output member, that is driven by the motor and employed to transmit power to the driver to thereby cause the driver to translate along the axis; and operating the driving tool over a complete cycle with a first cycle portion and at least one second cycle portion, the complete cycle including: transmitting electrical power from the electrical power source to the motor over the first cycle portion to thereby rotate the output member; determining a first parameter, the first parameter being related to the back electromotive force that is generated by the motor without providing electrical power to the motor; adjusting a time interval of the first cycle portion if a magnitude of the parameter is less than a predetermined first threshold or greater than a predetermined second threshold; transmitting electrical power from the electrical power source to the motor over a first one of the second cycle portions to thereby rotate the output member; re-determining the first parameter after completion of the first one of the second cycle portions; and determining an apparent voltage of a next one of the second cycle portions based on a magnitude of the first parameter.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

Figure 1:
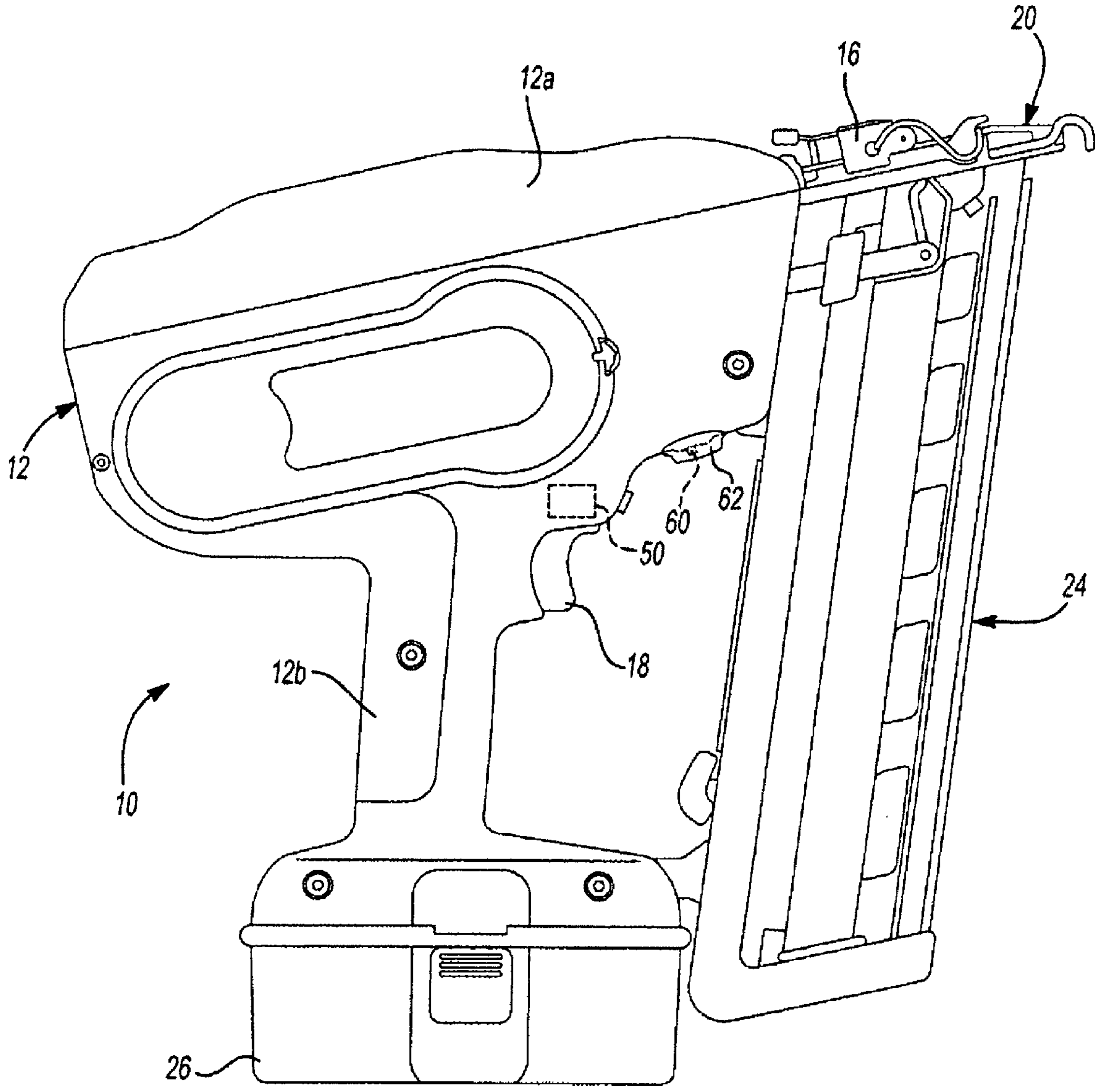
FIG. 1 is a side view of a fastening tool constructed in accordance with the teachings of the present invention.

With initial reference to FIG. 1, an electric fastener delivery device, which may be referred to herein as a nailer, is generally indicated by reference numeral 10. While the electric fastener delivery device is generally described in terms of a fastening tool 10 that drives nails into a workpiece, the electric fastener delivery device may be configured to deliver different fasteners, such as a staple or screw, or combinations of one or more of the different fasteners. Further, while the fastening tool 10 is generally described as an electric nailer, many of the features of the fastening tool 10 described below may be implemented in a pneumatic nailer or other devices, including rotary hammers, hole forming tools, such as punches, and riveting tools, such as those that are employed to install deformation rivets.

Figure 2:
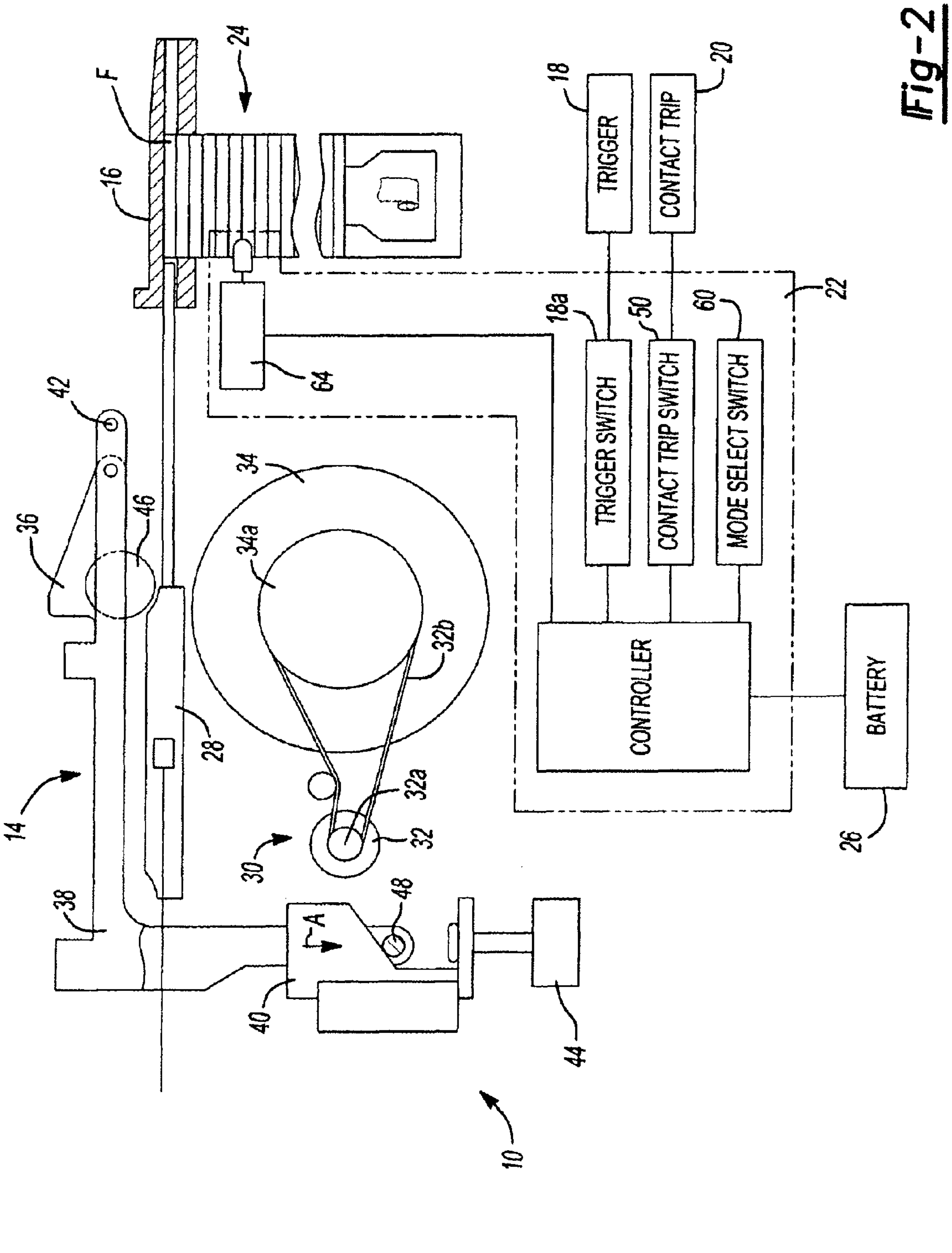
FIG. 2 is a schematic view of a portion of the fastening tool of FIG. 1 illustrating various components including the motor assembly and the controller.

With continuing reference to FIG. 1 and additional reference to FIGS. 2 and 3, the fastening tool 10 may include a housing 12, a motor assembly 14, a nosepiece 16, a trigger 18, a contact trip 20, a control unit 22, a magazine 24, and a battery 26, which provides electrical power to the various sensors (which are discussed in detail, below) as well as the motor assembly 14 and the control unit 22. Those skilled in the art will appreciate from this disclosure, however, that in place of, or in addition to the battery 26, the fastening tool 10 may include an external power cord (not shown) for connection to an external power supply (not shown) and/or an external hose or other hardware (not shown) for connection to a source of fluid pressure.

The housing 12 may include a body portion 12*a,* which may be configured to house the motor assembly 14 and the control unit 22, and a handle 12*b*. The handle 12*b* may provide the housing 12 with a conventional pistol-grip appearance and may be unitarily formed with the body portion 12*a* or may be a discrete fabrication that is coupled to the body portion 12*a,* as by threaded fasteners (not shown). The handle 12*b* may be contoured so as to ergonomically fit a user's hand and/or may be equipped with a resilient and/or non-slip covering, such as an overmolded thermoplastic elastomer.

The motor assembly 14 may include a driver 28 and a power source 30 that is configured to selectively transmit power to the driver 28 to cause the driver 28 to translate along an axis. In the particular example provided, the power source 30 includes an electric motor 32, a flywheel 34, which is coupled to an output shaft 32*a* of the electric motor 32, and a pinch roller assembly 36. The pinch roller assembly 36 may include an activation arm 38, a cam 40, a pivot pin 42, an actuator 44, a pinch roller 46 and a cam follower 48.

A detailed discussion of the motor assembly 14 that is employed in this example is beyond the scope of this disclosure and is discussed in more detail in commonly assigned U.S. Provisional Patent Application Ser. No. 60/559,344 filed Apr. 2, 2004 entitled "Fastening Tool" and commonly assigned co-pending U.S. application Ser. No. 11/095,727 entitled "Structural Backbone/Motor Mount For A Power Tool", which was filed on Mar. 31, 2005, and both of which are hereby incorporated by reference as if fully set forth in their entirety herein. Briefly, the motor 32 may be operable for rotating the flywheel 34 (e.g., via a motor pulley 32*a,* a belt 32*b* and a flywheel pulley 34*a*). The actuator 44 may be operable for translating the cam 40 (e.g., in the direction of arrow A) so that the cam 40 and the cam follower 48 cooperate to rotate the activation arm 38 about the pivot pin 42 so that the pinch roller 46 may drive the driver 28 into engagement with the rotating flywheel 34. Engagement of the driver 28 to the flywheel 34 permits the flywheel 34 to transfer energy to the driver 28 which propels the driver 28 toward the nosepiece 16 along the axis.

A detailed discussion of the nosepiece 16, contact trip 20 and the magazine 24 that are employed in this example is beyond the scope of this disclosure and are discussed in more detail in U.S. Provisional Patent Application Ser. No. 60/559,343 filed Apr. 2, 2004 entitled "Contact Trip Mechanism For Nailer", U.S. Provisional Patent Application Ser. No. 60/559,342 filed Apr. 2, 2004 entitled "Magazine Assembly For Nailer", U.S. Pat. No. 7,213,732 entitled "Contact Trip Mechanism For Nailer" and U.S. patent application Ser. No. 11/050,280 entitled "Magazine Assembly For Nailer" filed on Feb. 3, 2005, all of which are being incorporated by reference as if fully set forth in their entirety herein. The nosepiece 16 may extend from the body portion 12*a* proximate the magazine 24 and may be conventionally configured to engage the magazine 24 so as to sequentially receive fasteners F therefrom. The nosepiece 16 may also serve in a conventional manner to guide the driver 28 and fastener F when the fastening tool 10 has been actuated to install the fastener F to a workpiece.

The trigger 18 may be coupled to the housing 12 and is configured to receive an input from the user, typically by way of the user's finger, which may be employed in conjunction with a trigger switch 18*a* to generate a trigger signal that may be employed in whole or in part to initiate the cycling of the fastening tool 10 to install a fastener F to a workpiece (not shown).

The contact trip 20 may be coupled to the nosepiece 16 for sliding movement thereon. The contact trip 20 is configured to slide rearwardly in response to contact with a workpiece and may interact either with the trigger 18 or a contact trip sensor 50. In the former case, the contact trip 20 cooperates with the trigger 18 to permit the trigger 18 to actuate the trigger switch 18*a* to generate the trigger signal. More specifically, the trigger 18 may include a primary trigger, which is actuated by a finger of the user, and a secondary trigger, which is actuated by sufficient rearward movement of the contact trip 20. Actuation of either one of the primary and secondary triggers will not, in and of itself, cause the trigger switch 18*a* to generate the trigger signal. Rather, both the primary and the secondary trigger must be placed in an actuated condition to cause the trigger 18 to generate the trigger signal.

In the latter case (i.e., where the contact trip 20 interacts with the contact trip sensor 50), which is employed in the example provided, rearward movement of the contact trip 20 by a sufficient amount causes the contact trip sensor 50 to generate a contact trip signal which may be employed in conjunction with the trigger signal to initiate the cycling of the fastening tool 10 to install a fastener F to a workpiece.

The control unit 22 may include a power source sensor 52, a controller 54, an indicator, such as a light 56 and/or a speaker 58, and a mode selector switch 60. The power source sensor 52 is configured to sense a condition in the power source 30 that is indicative of a level of kinetic energy of an element in the power source 30 and to generate a sensor signal in response thereto. For example, the power source sensor 52 may be operable for sensing a speed of the output shaft 32*a* of the motor 32 or of the flywheel 34. As one of ordinary skill in the art would appreciate from this disclosure, the power source sensor 52 may sense the characteristic directly or indirectly. For example, the speed of the motor output shaft 32*a* or flywheel 34 may be sensed directly, as through encoders, eddy current sensors or Hall effect sensors, or indirectly, as through the back electromotive force of the motor 32. In the particular example provided, we employed back electromotive force, which is produced when the motor 32 is not powered by the battery 26 but rather driven by the speed and inertia of the components of the motor assembly 14 (especially the flywheel 34 in the example provided).

The mode selector switch 60 may be a switch that produces a mode selector switch signal that is indicative of a desired mode of operation of the fastening tool 10. One mode of operation may be, for example, a sequential fire mode wherein the contact trip 20 must first be abutted against a workpiece (so that the contact trip sensor 50 generates the contact trip sensor signal) and thereafter the trigger switch 18*a* is actuated to generate the trigger signal. Another mode of operation may be a mandatory bump feed mode wherein the trigger switch 18*a* is first actuated to generate the trigger signal and thereafter the contact trip 20 abutted against a workpiece so that the contact trip sensor 50 generates the contact trip sensor signal. Yet another mode of operation may be a combination mode that permits either sequential fire or bump feed wherein no particular sequence is required (i.e., the trigger sensor signal and the contact trip sensor signal may be made in either order or simultaneously). In the particular example provided, the mode selector switch 60 is a two-position switch that permits the user to select either the sequential fire mode or the combination mode that permits the user to operate the fastening tool 10 in either a sequential fire or bump feed manner.

Figure 7:
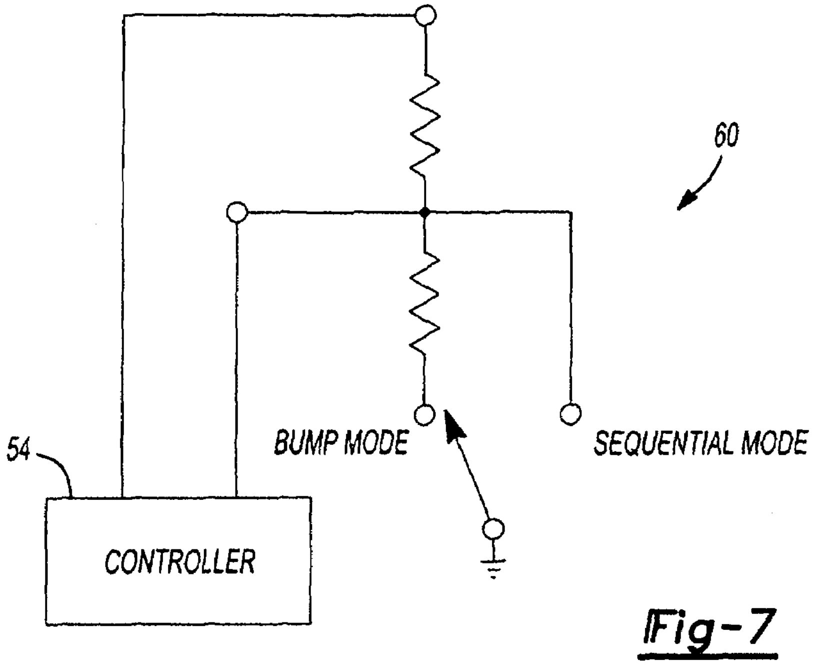
FIG. 7 is a schematic illustration of a portion of the nailer of FIG. 1 illustrating the controller and the mode selector switch in greater detail.

The controller 54 may be configured such that the fastening tool 10 will be operated in a given mode, such as the bump feed mode, only in response to the receipt of a specific signal from the mode selector switch 60. With brief additional reference to FIG. 7, the placement of the mode selector switch 60 in a first position causes a signal of a predetermined first voltage to be applied to the controller 54, while the placement of the mode selector switch 60 in a second position causes a signal of a predetermined second voltage to be applied to the controller 54. Limits may be placed on the voltage of one or both of the first and second voltages, such as ±0.2V, so that if the voltage of one or both of the signals is outside the limits the controller 54 may default to a given feed mode (e.g., to the sequential feed mode) or operational condition (e.g., inoperative).

For example, the mode selector switch 60 and the controller 54 may be configured such that a +5 volt supply is provided to mode selector switch 60, placement of the mode selector switch 60 in a position that corresponds to mandatory sequential feed causes a +5 volt signal to be returned to the controller 54, and placement of the mode selector switch 60 in a position that permits bump feed operation causes a +2.5 volt signal to be returned to the controller 54. The different voltage may be obtained, for example, by routing the +5 volt signal through one or more resistors R when the mode selector switch 60 is positioned in a position that permits bump feed operation. Upon receipt of a signal from the mode selector switch 60, the controller 54 may determine if the voltage of the signal is within a prescribed limit, such as ±0.2 volts. In this example, if the voltage of the signal is between +5.2 volts to +4.8 volts, the controller 54 will interpret the mode selector switch 60 as requiring sequential feed operation, whereas if the voltage of the signal is between +2.7 volts to +2.3 volts, the controller 54 will interpret the mode selector switch 60 as permitting bump feed operation. If the voltage of the signal is outside these windows (i.e., greater than +5.2 volts, between +4.8 volts and +2.7 volts, or lower than +2.3 volts in the example provided), the controller 54 may cause the fastening tool 10 to operate in a predetermined mode, such as one that requires sequential feed operation. The controller 54 may further provide the user with some indication (e.g., a light or audible alarm) of a fault in the operation of the fastening tool 10 that mandates the operation of the fastening tool 10 in the predetermined mode.

The lights 56 of the fastening tool may employ any type of lamp, including light emitting diodes (LEDs) may be employed to illuminate portions of the worksite, which may be limited to or extend beyond the workpiece, and/or communicate information to the user or a device (e.g., data terminal). Each light 56 may include one or more lamps, and the lamps may be of any color, such as white, amber or red, so as to illuminate the workpiece or provide a visual signal to the operator. Where the lights 56 are to be employed to illuminate the worksite, the one or more of the lights 56 may be actuated by a discrete switch (not shown) or by the controller 54 upon the occurrence of a predetermined condition, such the actuation of the trigger switch 18*a*. The lights 56 may be further deactivated by switching the state of a discrete switch or by the controller 54 upon the occurrence of a predetermined condition, such as the elapsing of a predetermined amount of time.

Where the lights 56 are to be employed to communicate information, the light(s) 56 may be actuated by the controller 54 in response to the occurrence of a predetermined condition. For example, the lights 56 may flash a predetermined number of times, e.g., four times, or in a predetermined pattern in response to the determination that a charge level of the battery 26 has fallen to a predetermined level or if the controller 54 determines that a fastener has jammed in the nosepiece 16. This latter condition may be determined, for example, through back-emf sensing of the motor 32.

Additionally or alternatively, the light(s) 56 may be employed to transmit information optically or electrically to a reader. In one embodiment, light generated by the light(s) 56 is received by an optical reader 500 to permit tool data, such as the total number of cycles operated, the type and frequency of any faults that may have occurred, the values presently assigned to various adjustable parameters, etc. to be downloaded from the fastening tool 10. In another embodiment, a sensor 502 is coupled to a circuit 504 in the fastening tool 10 to which the light(s) 56 are coupled. The sensor 502 may be operable for sensing the current that passes through the light(s) 56 and/or the voltage on a leg of the circuit 504 that is coupled to the light(s) 56. As the illumination of the light(s) 56 entails both a change in the amount of current passing there through and a change in the voltage on the leg of the circuit 504 that is coupled to the light(s) 56, selective illumination of the light(s) 56 may be employed to cause a change in the current and/or voltage that may be sensed by the sensor 502. A signal produced by the sensor 502 in response to the changes in the current and/or voltage may be received by a reader that receives the signal that is produced by the sensor 502. Accordingly, those of ordinary skill in the art will appreciate from this disclosure that the operation light(s) 56 may be employed to affect an electric characteristic, such as current draw or voltage, that may be sensed by the sensor 502 and employed by a reader to transmit data from the tool 10.

The controller 54 may be coupled to the mode selector switch 60, the trigger switch 18*a,* the contact trip sensor 50, the motor 32, the power source sensor 52 and the actuator 44. In response to receipt of the trigger sensor signal and the contact trip sensor signal, the controller 54 determines whether the two signals have been generated at an appropriate time relative to the other (based on the mode selector switch 60 and the mode selector switch signal).

If the order in which the trigger sensor signal and the contact trip sensor signal is not appropriate (i.e., not permitted based on the setting of the mode selector switch 60), the controller 54 does not enable electrical power to flow to the motor 32 but rather may activate an appropriate indicator, such as the lights 56 and/or the speaker 58. The lights 56 may be illuminated in a predetermined manner (e.g., sequence and/or color) and/or the speaker 58 may be employed to generate an audio signal so as to indicate to the user that the trigger switch 18*a* and the contact trip sensor 50 have not been activated in the proper sequence. To reset the fastening tool 10, the user may be required to deactivate one or both of the trigger switch 18*a* and the contact trip sensor 50.

If the order in which the trigger sensor signal and the contact trip sensor signal is appropriate (i.e., permitted based on the setting of the mode selector switch 60), the controller 54 enables electrical power to flow to the motor 32, which causes the motor 32 to rotate the flywheel 34. The power source sensor 52 may be employed to permit the controller 54 to determine whether the fastening tool 10 has an energy level that exceeds a predetermined threshold. In the example provided, the power source sensor 52 is employed to sense a level of kinetic energy of an element in the motor assembly 14. In the example provided, the kinetic energy of the motor assembly 14 is evaluated based on the back electromotive force generated by the motor 32. Power to the motor 32 is interrupted, for example after the occurrence of a predetermined event, which may be the elapse of a predetermined amount of time, and the voltage of the electrical signal produced by the motor 32 is sensed. As the voltage of the electrical signal produced by the motor 32 is proportional to the speed of the motor output shaft 32*c* (and flywheel 34), the kinetic energy of the motor assembly 14 may be reliably determined by the controller 54.

As those of ordinary skill in the art would appreciate from this disclosure, the kinetic energy of an element in the power source 30 may be determined (e.g., calculated or approximated) either directly through an appropriate relationship (e.g., $e=\frac{1}{2} I\times\omega^2$; $e=\frac{1}{2} m\times v^2$) or indirectly, through an evaluation of one or more of the variables that are determinative of the kinetic energy of the motor assembly 14 since at least one of the linear mass and inertia of the relevant component is substantially constant. In this regard, the rotational speed of an element, such as the motor output shaft 32*a* or the flywheel 34, or the characteristics of a signal, such as its frequency of a signal or voltage, may be employed by themselves as a means of approximating kinetic energy. For example, the kinetic energy of an element in the power source 30 may be "determined" in accordance with the teachings of the present invention and appended claims by solely determining the rotational speed of the element. As another example, the kinetic energy of an element in the power source 30 may be "determined" in accordance with the teachings of the present invention and appended claims by solely determining a voltage of the back electromotive force generated by the motor 32.

If the controller 54 determines that the level of kinetic energy of the element in the motor assembly 14 exceeds a predetermined threshold, a signal may be generated, for example by the controller 54, so that the actuator 44 may be actuated to drive the cam 40 in the direction of arrow A, which as described above, will initiate a sequence of events that cause the driver 28 to translate to install a fastener F into a workpiece.

If the controller 54 determines that the level of kinetic energy of the element in the motor assembly 14 does not exceed the predetermined threshold, the lights 56 may be illuminated in a predetermined manner (e.g., sequence and/or color) and/or the speaker 58 may be employed to generate an audio signal so as to indicate to the user that the fastening tool 10 may not have sufficient energy to fully install the fastener F to the workpiece. The controller 54 may be configured such that the actuator 44 will not be actuated to drive the cam 40 in the direction of arrow A if the kinetic energy of the element of the motor assembly 14 does not exceed the predetermined threshold, or the controller 54 may be configured to permit the actuation of the actuator 44 upon the occurrence of a predetermined event, such as releasing and re-actuating the trigger 18, so that the user acknowledges and expressly overrides the controller 54.

While the fastening tool 10 has been described thus far as employing a single kinetic energy threshold, the invention, in its broader aspects, may be practiced somewhat differently. For example, the controller 54 may further employ a secondary threshold that is representative of a different level of kinetic energy than that of the above-described threshold. In situations where the level of kinetic energy in the element of the motor assembly 14 is higher than the above-described threshold (i.e., so that operation of the actuator 44 is permitted by the controller 54) but below the secondary threshold, the controller 54 may activate an indicator, such as the lights 56 or speaker 58 to provide a visual and/or audio signal that indicates to the user that the battery 26 may need recharging or that the fastening tool 10 may need servicing.

Further, the above-described threshold and the secondary threshold, if employed, may be adjusted based on one or more predetermined conditions, such as a setting to which the fastener F is driven into the workpiece, the relative hardness of the workpiece, the length of the fastener F and/or a multi-position or variable switch that permits the user to manually adjust the threshold or thresholds.

Figure 4:
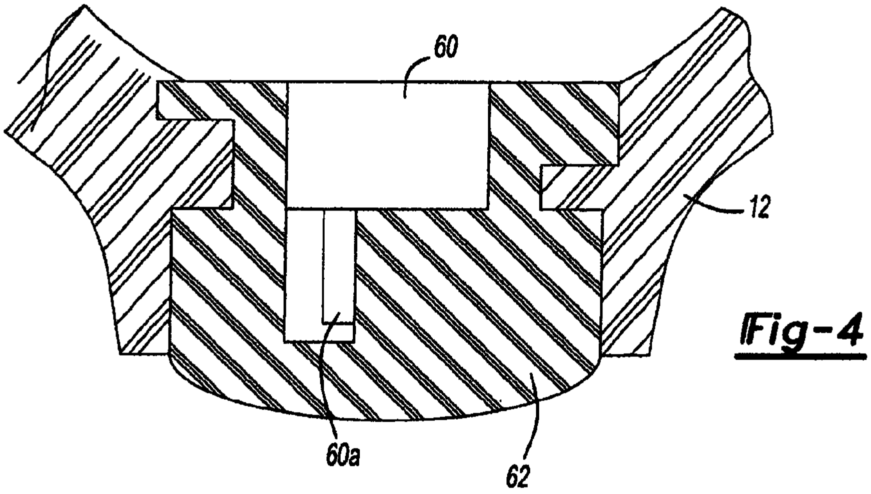
FIG. 4 is a sectional view of a portion of the fastening tool illustrating the mode selector switch.

With reference to FIGS. 1 and 4, the fastening tool 10 may optionally include a boot 62 that removably engages a portion of the fastening tool 10 surrounding the mode selector switch 60. In the example provided, the boot 62 may be selectively coupled to the housing 12. The boot 62 may be configured to inhibit the user from changing the state of the mode selector switch 60 by inhibiting a switch actuator 60*a* from being moved into a position that would place the mode selector switch 60 into an undesired state. Additionally or alternatively, the boot 62 may protect the mode selector switch 60 (e.g., from impacts, dirt, dust and/or water) when the boot 62 is in an installed condition. Further, the boot 62 may be shaped such that it only mates with the fastening tool 10 in a single orientation and is thus operable to secure the switch 60 in only a single predetermined position, such as either the first position or the second position, but not both. Optionally, the boot 62 may also conceal the presence of the mode selector switch 60.

Returning to FIGS. 2 and 3, the fastening tool 10 may also include a fastener sensor 64 for sensing the presence of one or more fasteners F in the fastening tool 10 and generating a fastener sensor signal in response thereto. The fastener sensor 64 may be a limit switch or proximity switch that is configured to directly sense the presence of a fastener F or of a portion of the magazine 24, such as a pusher 66 that conventionally urges the fasteners F contained in the magazine 24 upwardly toward the nosepiece 16. In the particular example provided, the fastener sensor 64 is a limit switch that is coupled to the nosepiece 16 and positioned so as to be contacted by the pusher 66 when a predetermined quantity of fasteners F are disposed in the magazine 24 and/or nosepiece 16. The predetermined quantity may be any integer that is greater than or equal to zero. The controller 54 may also activate an appropriate indicator, such as the lights 56 and/or speaker 58, to generate an appropriate visual and/or audio signal in response to receipt of the fastener sensor signal that is generated by the fastener sensor 64. Additionally or alternatively, the controller 54 may inhibit the cycling of the fastening tool 10 (e.g., by inhibiting the actuation of the actuator 44 so that the cam 40 is not driven in the direction of arrow A) in some situations. For example, the controller 54 may inhibit the cycling of the fastening tool 10 when the fastener sensor 64 generates the fastener sensor signal (i.e., when the quantity of fasteners F in the magazine 24 is less than the predetermined quantity). Alternatively, the controller 54 may be configured to inhibit the cycling of the fastening tool 10 only after the magazine 24 and nosepiece 16 have been emptied. In this regard, the controller 54 may "count down" by subtracting one (1) from the predetermined quantity each time the fastening tool 10 has been actuated to drive a fastener F into the workpiece. Consequently, the controller 54 may count down the number of fasteners F that remain in the magazine 24 and inhibit further cycling of the fastening tool 10 when the controller 54 determines that no fasteners F remain in the magazine 24 or nosepiece 16.

The trigger switch 18*a* and the contact trip sensor 50 can be conventional power switches. Conventional power switches, however, tend to be relatively bulky and employ a relatively large air gap between the contacts of the power switch. Accordingly, packaging of the switches into the fastening tool 10, the generation of heat by and rejection of heat from the power switches, and the durability of the power switches due to arcing are issues attendant with the use of power switches. Alternatively, the trigger switch 18*a* and the contact trip sensor 50 can be microswitches that are incorporated into a circuit that employs solid-state componentry to activate the motor assembly 14 to thereby reduce or eliminate concerns for packaging, generation and rejection of heat and durability due to arcing.

Figure 5:
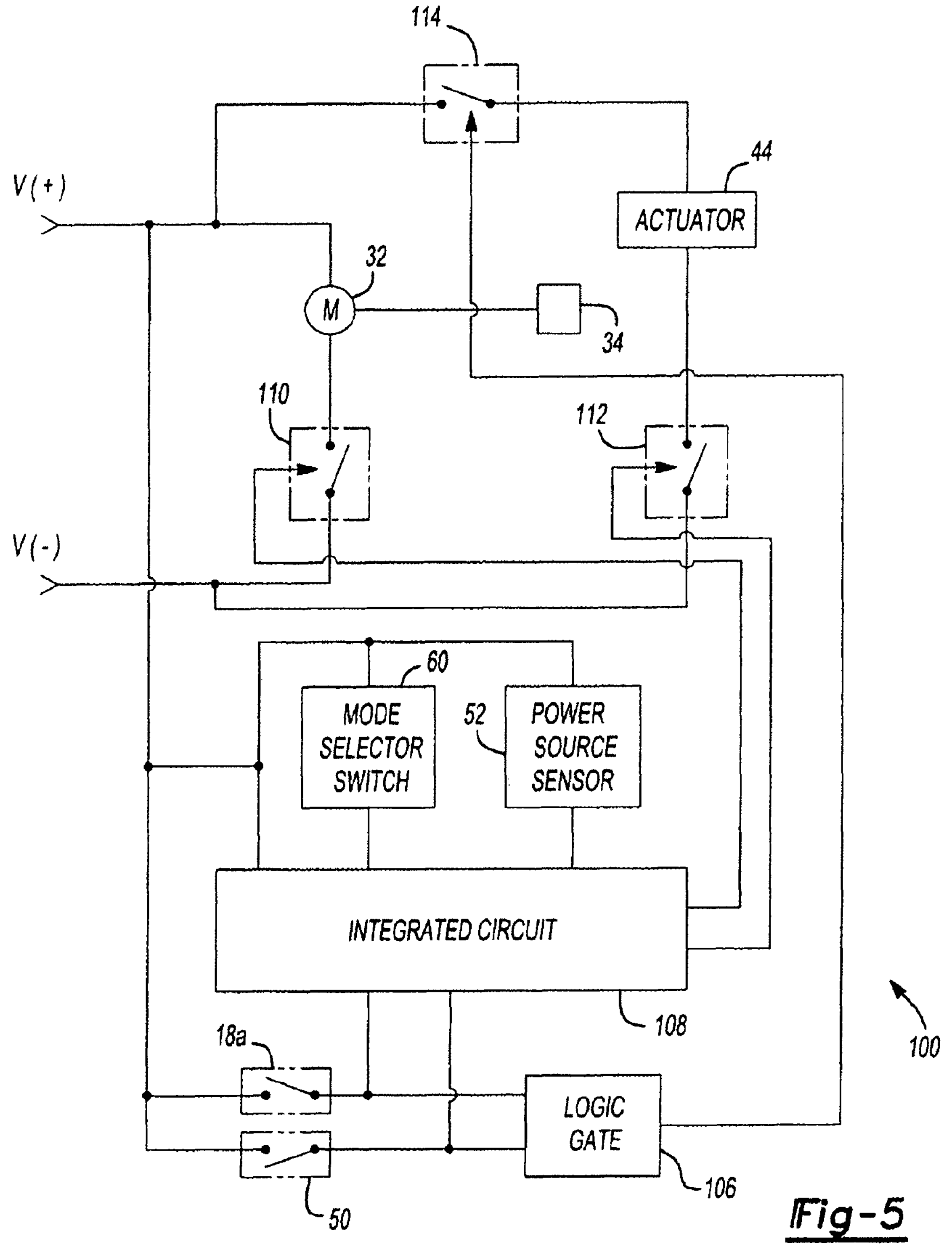
FIG. 5 is a schematic illustration of a portion of the controller.

With reference to FIG. 5, the controller 54 may include a control circuit 100. The control circuit 100 may include the trigger switch 18*a*, the contact trip sensor 50, a logic gate 106, an integrated circuit 108, a motor switch 110, a first actuator switch 112, and a second actuator switch 114. The switches 110, 112 and 114 may be any type of switch, including a MOSFET, a relay and/or a transistor.

The motor switch 110 may be a power controlled device that may be disposed between the motor 32 and a power source, such as the battery 26 (FIG. 1) or a DC-DC power supply (not shown). The first and second actuator switches 112 and 114 may also be power controlled devised that are disposed between the actuator 44 and the power source. In the particular example provided, the first and second actuator switches 112 and 114 are illustrated as being disposed on opposite sides of the actuator 44 between the actuator 44 and the power source, but in the alternative could be situated in series between the actuator and the power source. The trigger switch 18*a* and the contact trip sensor 50 are coupled to both the logic gate 106 and the integrated circuit 108. The integrated circuit 108 may be responsive to the steady state condition of the trigger switch 18*a* and/or the contact trip sensor 50, or may be responsive to a change in one or both of their states (e.g., a transition from high-to-low or from low-to-high).

Actuation of the trigger switch 18*a* produces a trigger switch signal that is transmitted to both the logic gate 106 and the integrated circuit 108. As the contact trip sensor 50 has not changed states (yet), the logic condition is not satisfied and as such, the logic gate 106 will not transmit a signal to the first actuator switch 112 that will cause the logic gate 106 to change the state of the first actuator switch 112. Accordingly, the first actuator switch 112 is maintained in its normal state (i.e., open in the example provided). The integrated circuit 108, however, transmits a signal to the motor switch 110 in response to receipt of the trigger switch signal which causes the motor switch 110 to change states (i.e., close in the example provided), which completes an electrical circuit that permits the motor 32 to operate.

Actuation of the contact trip sensor 50 produces a contact trip sensor signal that is transmitted to both the logic gate 106 and the integrated circuit 108. If the trigger switch 18*a* had continued to transmit the trigger switch signal, the logic condition is satisfied and as such, the logic gate 106 will transmit a signal to the first actuator switch 112 that will cause it to change states. Accordingly, the first actuator switch 112 is changed to a closed state in the example provided. Upon receipt of the contact trip sensor signal, the integrated circuit 108 transmits a signal to the second actuator switch 114 which causes the second actuator switch 114 to change states (i.e., close in the example provided), which in conjunction with the changing of the state of the first actuator switch 112, completes an electrical circuit to permit the actuator 44 to operate.

Various other switches, such as the mode selector switch 60 and/or the power source sensor 52, may be coupled to the integrated circuit 108 to further control the operation of the various relays. For example, if the mode selector switch 60 were placed into a position associated with the operation of the fastening tool 10 in either a bump feed or a sequential feed manner, the integrated circuit 108 may be configured to change the state of the motor switch 110 upon receipt of either the trigger switch signal or the contact trip sensor signal and thereafter change the state of the second actuator switch 114 upon receipt of the other one of the trigger switch signal and the contact trip sensor signal.

As another example, if the power source sensor 52 generated a signal that was indicative of a situation where the level of kinetic energy in the motor assembly 14 is less than a predetermined threshold, the integrated circuit 108 may be configured so as to not generate a signal that would change the state of the second actuator switch 114 to thereby inhibit the operation of the fastening tool 10.

From the foregoing, it will be appreciated that actuation of the motor assembly 14 cannot occur as a result of a single point failure (e.g., the failure of one of the trigger switch 18*a* or the contact trip sensor 50).

Figure 3:
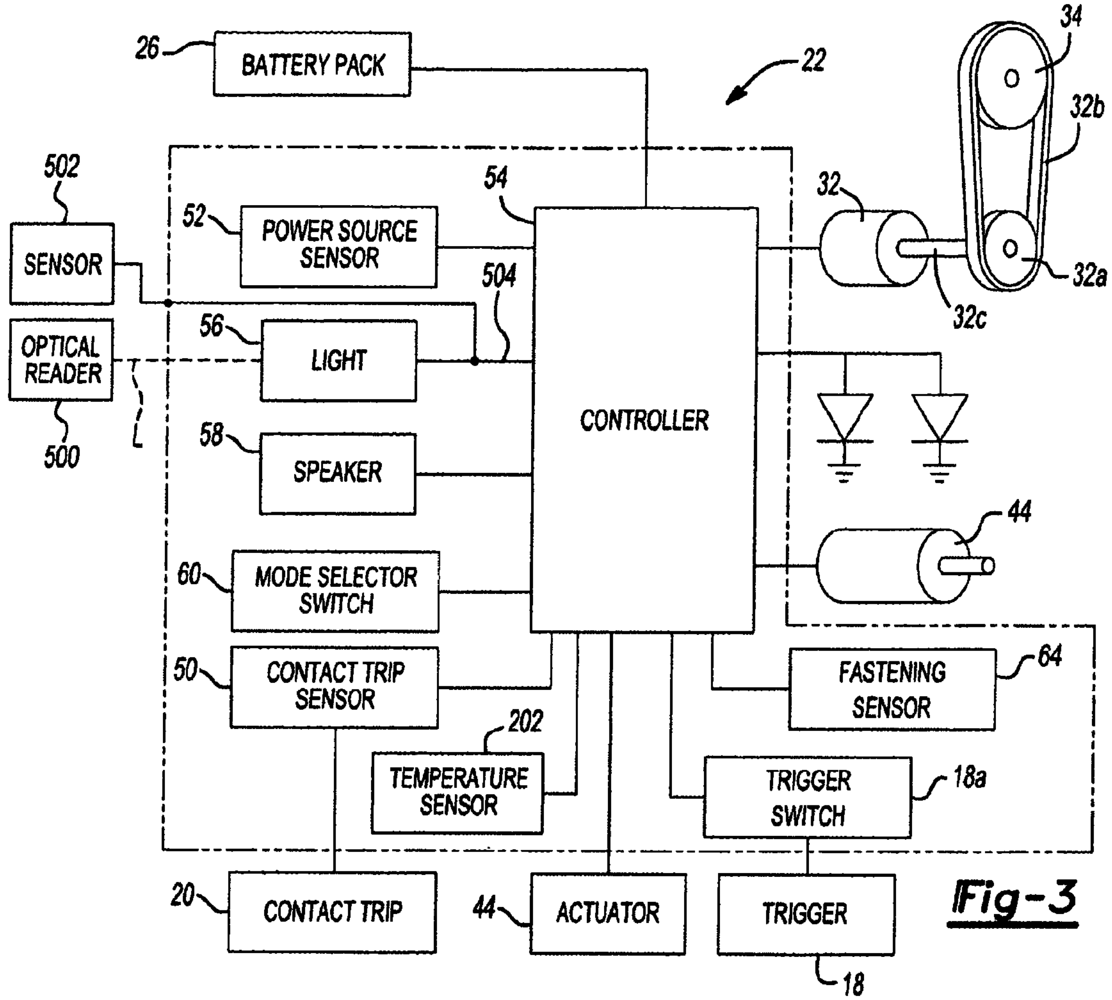
FIG. 3 is a schematic view of a portion of the fastening tool of FIG. 1, illustrating the controller in greater detail.
Figure 6:
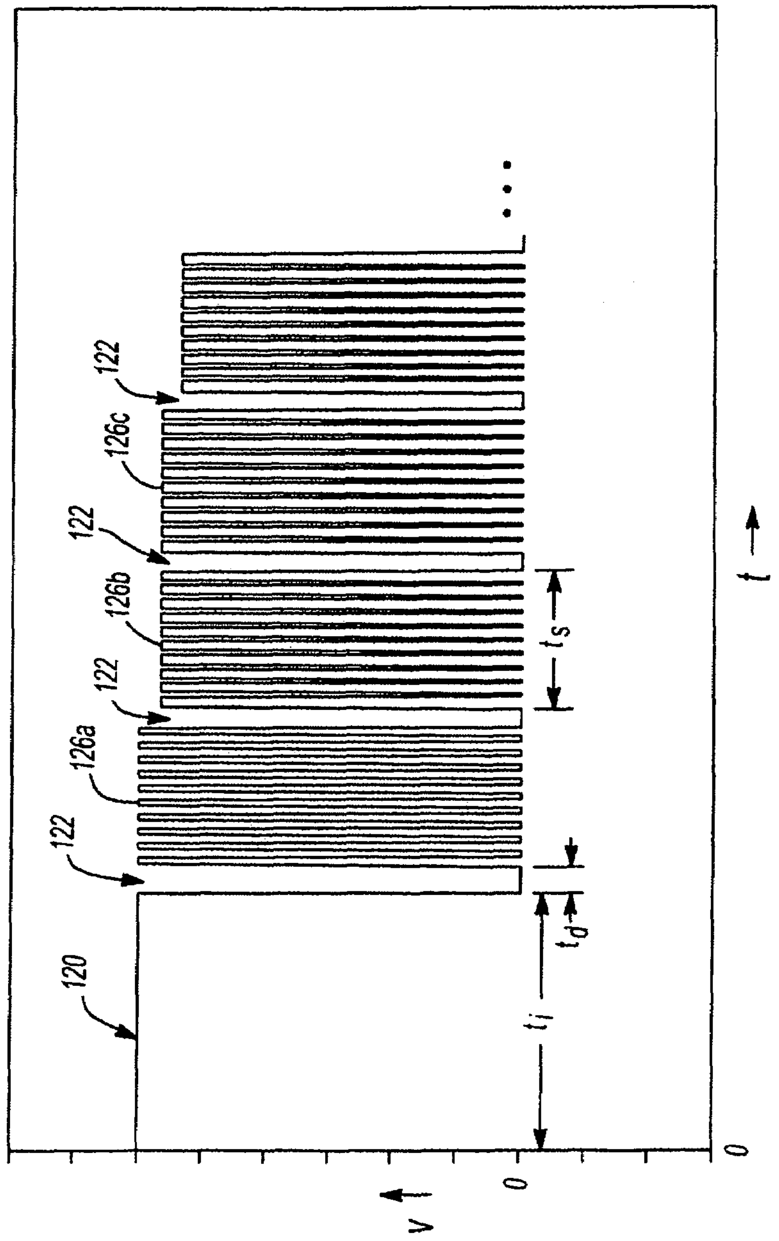
FIG. 6 is a plot illustrating exemplary duty cycles of a motor of the present invention.

With reference to FIGS. 3 and 6, the controller 54 may be provided with additional functionality to permit the fastening tool 10 to operate using battery packs of various different voltages, such as 18, 14, 14 and/or 9.6 volt battery packs. For example, the controller 54 may employ. pulse width modulation (PWM), DC/DC converters, or precise on-time control to control the operation of the motor 32 and/or the actuator 44, for example to ensure consistent speed of the flywheel 34/kinetic energy of the motor assembly 14 regardless of the voltage of the battery. The controller 54 may be configured to sense or otherwise determine the actual or nominal voltage of the battery 26 at start-up (e.g., when the battery 26 is initially installed or electrically coupled to the controller 54).

Power may be supplied to the motor 32 over all or a portion of a cycle using a pulse-width modulation technique, an example of which is illustrated in FIG. 6. The cycle, which may be initiated by a predetermined event, such as the actuation of the trigger 18, may include an initial power interval 120 and one or more supplemental power intervals (e.g., 126*a*, 126*b*, 126*c*). The initial power interval 120 may be an interval over which the full voltage of the battery 26 may be employed to power the motor 32. The length or duration (ti) of the initial power interval 120 may be determined through an algorithm or a look-up table in the memory of the controller 54 for example, based on the output of the battery 26 or on an operating characteristic, such as rotational speed, of a component in the motor assembly 14. The length or duration (ts) of each supplemental power interval may equal that of the initial power interval 120, or may be a predetermined constant, or may be varied based on the output of the battery 26 or on an operating characteristic of the motor assembly 14.

A dwell interval 122 may be employed between the initial power interval 120 and a first supplemental power interval 126*a* and/or between successive supplemental power intervals. The dwell intervals 122 may be of a varying length or duration (td), but in the particular example provided, the dwell intervals 122 are of a constant duration (td). During a dwell interval 122, power to the motor 32 may be interrupted so as to permit the motor 32 to “coast”. The output of the power source sensor 52 may be employed during this time to evaluate the level of kinetic energy in the motor assembly 14 (e.g., to permit the controller 54 to determine whether the motor assembly 14 has sufficient energy to drive a fastener) and/or to determine one or more parameters by which the motor 32 may be powered or operated in a subsequent power interval.

In the example provided, the controller 54 evaluates the back emf of the motor 32 to approximate the speed of the flywheel 34. The approximate speed of the flywheel 34 (or an equivalent thereof, such as the value of the back emf of the motor 32) may be employed in an algorithm or look-up table to determine the duty cycle (e.g., apparent voltage) of the next supplemental power interval. Additionally, if the back emf of the motor 32 is taken in a dwell interval 122 immediately after an initial power interval 120, an algorithm or look-up table may be employed to calculate changes to the duration (ti) of the initial power interval 120. In this way, the value (ti) may be constantly updated as the battery 26 is discharged. The value (ti) may be reset (e.g., to a value that may be stored in a look-up table) when a battery 26 is initially coupled to the controller 54. For example, the controller 54 may set (ti) equal to 180 ms if the battery 26 has a nominal voltage of about 18 volts, or to 200 ms if the battery 26 has a nominal voltage of about 14.4 volts, or to 240 ms if the battery 26 has a nominal voltage of about 12 volts.

Figure 8:
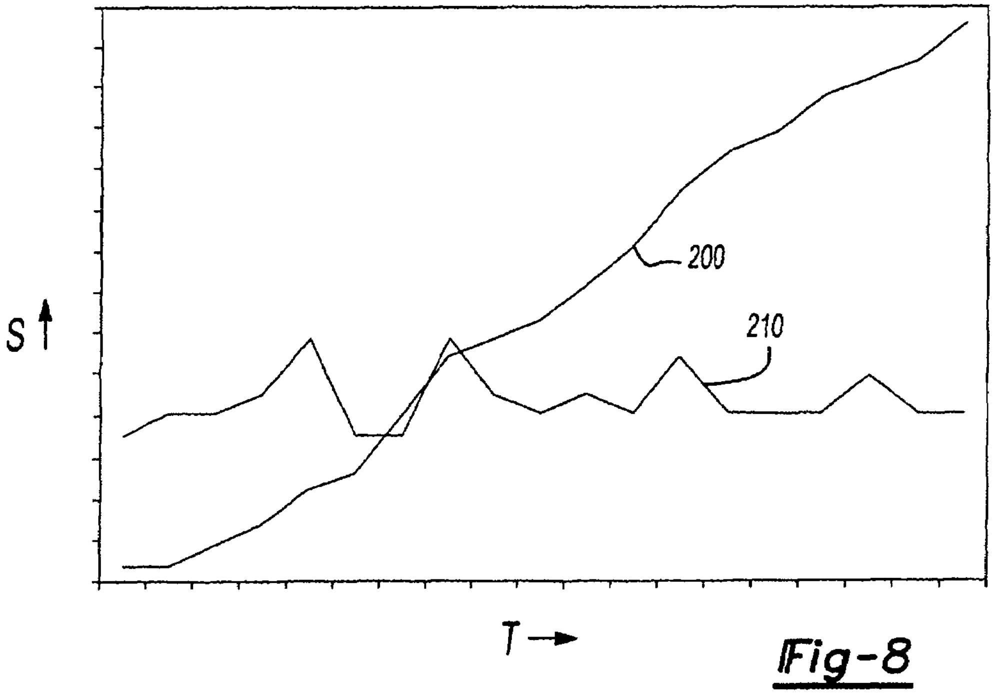
FIG. 8 is a plot illustrating the relationship between actual motor speed and the temperature of the motor when the back-emf of the motor is held constant and when the back-emf based speed of motor is corrected for temperature.

With reference to FIG. 8, the back-emf of the motor 32 may change with the temperature of the motor as is indicated by the line that is designated by reference numeral 200; the line 200 represents the actual rotational speed as a function of temperature when the back-emf of the motor is held constant. With additional reference to FIG. 3, the control unit 22 may include a temperature sensor 202 for sensing a temperature of the motor 32 or another portion of the fastening tool, such as the controller 54, to permit the controller 54 to compensate for differences in the back-emf of the motor 32 that occur with changes in temperature. In the particular example provided, the temperature sensor 202 is coupled to the controller 54 and generates a temperature signal in response to a sensed temperature of the controller 54. As the controller 54 is in relatively close proximity to the motor 32, the temperature of the controller 54 approximates the temperature of the motor 32.

The controller 54 may employ any known technique, such as a look-up table, mathematical relationship or an algorithm, to determine the effect of the sensed temperature on the back-emf of the motor 32. In the particular example provided, the relationship between the actual rotational speed of the motor 32 indicates linear regression, which permitted the use of an empirically-derived equation to determine a temperature-based speed differential (AST) that may be employed in conjunction with a back-emf-based calculated speed ($S_{BEF}$) to more closely approximate the rotational speed (S) of the motor 32 (i.e., $S=S_{BEF}-\Delta S_T$). The line designated by reference numeral 210 in FIG. 8 illustrates the actual speed of the motor 32 as a function of temperature when the approximate rotational speed (S) is held constant.

Alternatively, the controller 54 may approximate the rotational speed (S) of the motor 32 through the equation $S=|S_{BATV}+\Delta S_{BEF}-\Delta S_T|$ where $S_{BATV}$ can be an estimate of a base speed of the motor 32 based upon a voltage of the battery 26, $\Delta S_{BEF}$ can be a term that is employed to modify the base speed of the motor 32 based upon the back-emf produced by the motor 32, and $\Delta S_T$ can be the temperature-based speed differential described above. In the particular example provided, the voltage of the battery can be an actual battery voltage as opposed to a nominal battery voltage and the $S_{BATV}$ term can be derived as a function of the slope of a plot of motor speed versus battery voltage. As determined in this alternative manner, the speed of the motor can be determined in a manner that is highly accurate over a wide temperature range.

It will be appreciated that while the fastening tool 10 has been described as providing electrical power to the electric motor 32 except for relatively short duration intervals (e.g., between pulses and/or to check the back-emf of the motor 32) throughout an operational cycle, the invention, in its broadest aspects, may be carried out somewhat differently. For example, the controller 54 may control the operation of the motor 32 through feedback control wherein electric power is occasionally interrupted so as to allow the motor 32 and flywheel 34 to "coast". During the interruption of power, the controller 54 can occasionally monitor the kinetic energy of the motor assembly 14 and apply power to the motor if the kinetic energy of the motor assembly 14 falls below a predetermined threshold. Operation of the fastening tool in this manner can improve battery life.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A power tool for operating on a workpiece, the power tool comprising:
- a housing;
- a motor disposed within the housing;
- a controller connected to the motor and receiving user inputs for turning on the motor;
- a power tool battery pack connected to the controller and motor;
- at least one light connected to the controller for illuminating the workpiece;
- an optical reader connected to the at least one light, the optical reader receiving information transmitted by the at least one light and downloading tool data from the power tool;
- wherein the controller is configured to detect an occurrence of a predetermined condition within the power tool and control operation of the at least one light in a predetermined pattern in response to the detected predetermined condition.

2. The power tool of claim 1, wherein the at least one light comprises an LED.

3. The power tool of claim 2, wherein the at least one light comprises a white LED.

4. The power tool of claim 1, wherein the tool condition is that a charge level of the power tool battery pack is below a predetermined level.

5. The power tool of claim 4, wherein the predetermined pattern comprises turning on and off the at least one light.

6. The power tool of claim 5, wherein the predetermined pattern comprises turning on and off the at least one light a predetermined number of times.

7. The power tool of claim 1, wherein the power tool comprises a fastener driving device for driving a fastener through a workpiece having a nosepiece through which fasteners are driven, and wherein the tool condition is that the fastener has jammed in the nosepiece.

* * * * *